(12) United States Patent

Ikeda

(10) Patent No.: US 9,948,598 B2
(45) Date of Patent: Apr. 17, 2018

(54) DELIVERY CONTROL DEVICE, DATA DELIVERY SYSTEM, DELIVERY CONTROL METHOD, AND NON-TRANSITORY COMPUTER READABLE MEDIUM STORING DELIVERY CONTROL PROGRAM

(71) Applicant: RENESAS ELECTRONICS CORPORATION, Tokyo (JP)

(72) Inventor: Hidetoshi Ikeda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 198 days.

(21) Appl. No.: 14/949,647

(22) Filed: Nov. 23, 2015

(65) Prior Publication Data

US 2016/0248727 A1 Aug. 25, 2016

(30) Foreign Application Priority Data

Feb. 23, 2015 (JP) ................. 2015-032720

(51) Int. Cl.
| | | |
|---|---|---|
| H04L 29/12 | (2006.01) | |
| H04L 12/741 | (2013.01) | |
| H04L 12/28 | (2006.01) | |
| H04L 12/721 | (2013.01) | |

(52) U.S. Cl.
CPC ............ *H04L 61/103* (2013.01); *H04L 45/66* (2013.01); *H04L 45/745* (2013.01); *H04L 61/6022* (2013.01)

(58) Field of Classification Search
None
See application file for complete search history.

(56) References Cited

U.S. PATENT DOCUMENTS

| 6,442,144 B1 * | 8/2002 | Hansen ............. H04L 29/12018 370/255 |
| 6,697,326 B1 * | 2/2004 | Britton ............. H04L 29/12009 370/218 |
| 6,757,281 B1 * | 6/2004 | Irish .................. H04L 29/12009 370/389 |
| 6,856,621 B1 * | 2/2005 | Artes .................... H04L 12/185 370/390 |
| 7,046,666 B1 * | 5/2006 | Bollay ............. H04L 29/12009 370/392 |

(Continued)

FOREIGN PATENT DOCUMENTS

| JP | 2003-348093 A | 12/2003 |
| JP | 2014-155072 A | 8/2014 |

*Primary Examiner* — Alpus H Hsu
(74) *Attorney, Agent, or Firm* — McDermott Will & Emery LLP

(57) ABSTRACT

Provided is a delivery control device, a data delivery system, and a delivery control method that enable a simultaneous data delivery to a number of reception terminals by increasing the number of reception terminals simultaneously connecting to a router. The delivery control device 100 includes an IP address-MAC address record unit 105 that associates an IP address with a plurality of MAC addresses and holds the IP address and the MAC addresses, and a transmission unit 101, 102 that specifies a destination MAC address to transmit a packet. The transmission unit 101, 102 transmits a packet addressed to a predetermined IP address to all the MAC addresses that have been associated with the IP address in the IP address-MAC address record unit 105.

4 Claims, 7 Drawing Sheets

(56) References Cited

U.S. PATENT DOCUMENTS

| | | | | |
|---|---|---|---|---|
| 7,120,683 B2* | 10/2006 | Huang | H04L 45/00 | 370/352 |
| 7,174,390 B2* | 2/2007 | Schulter | H04L 12/28 | 709/238 |
| 7,234,163 B1* | 6/2007 | Rayes | H04L 29/12009 | 713/154 |
| 7,869,389 B2* | 1/2011 | Kang | H04L 12/4625 | 370/252 |
| 7,911,941 B2* | 3/2011 | Kaneko | H04L 45/00 | 370/220 |
| 8,782,160 B2* | 7/2014 | Torii | H04L 29/12028 | 709/208 |
| 8,782,789 B2* | 7/2014 | Cho | H04L 61/103 | 709/218 |
| 8,971,187 B2* | 3/2015 | Matsuoka | H04L 47/125 | 370/235 |
| 9,118,608 B2* | 8/2015 | Ido | H04L 45/745 | |
| 9,426,060 B2* | 8/2016 | Dixon | H04L 12/184 | |
| 9,438,555 B2* | 9/2016 | Raman | H04L 61/103 | |
| 9,647,939 B2* | 5/2017 | Kumagai | H04W 40/02 | |
| 2003/0043853 A1* | 3/2003 | Doyle | H04L 29/12009 | 370/489 |
| 2003/0088700 A1* | 5/2003 | Aiken | H04L 29/12009 | 709/245 |
| 2005/0147097 A1* | 7/2005 | Chari | H04L 29/12028 | 370/392 |
| 2005/0265354 A1* | 12/2005 | Ryu | H04L 29/12009 | 370/395.52 |
| 2006/0274752 A1* | 12/2006 | Jain | H04L 61/6077 | 370/392 |
| 2007/0022211 A1* | 1/2007 | Shimizu | H04L 29/12028 | 709/238 |
| 2007/0140264 A1* | 6/2007 | Chen | H04L 29/12028 | 370/395.54 |
| 2007/0201490 A1* | 8/2007 | Mahamuni | H04L 12/4625 | 370/395.54 |
| 2008/0008183 A1* | 1/2008 | Takagaki | H04L 45/00 | 370/392 |
| 2008/0250123 A1* | 10/2008 | Chae | H04L 29/12028 | 709/220 |
| 2013/0044754 A1* | 2/2013 | Zhu | H04L 29/12028 | 370/392 |
| 2013/0230053 A1* | 9/2013 | Hammer | H04L 45/54 | 370/401 |
| 2013/0294451 A1* | 11/2013 | Li | H04L 45/66 | 370/392 |
| 2014/0019639 A1* | 1/2014 | Ueno | H04L 61/103 | 709/238 |
| 2015/0043576 A1* | 2/2015 | Dixon | H04L 12/184 | 370/390 |
| 2015/0043581 A1* | 2/2015 | Devireddy | H04L 49/70 | 370/392 |
| 2015/0071289 A1* | 3/2015 | Shin | H04L 45/745 | 370/392 |
| 2015/0215265 A1* | 7/2015 | Lim | H04L 61/103 | 370/390 |
| 2015/0304271 A1* | 10/2015 | Ma | H04L 61/103 | 709/213 |
| 2015/0312137 A1* | 10/2015 | Li | H04L 12/6418 | 709/238 |
| 2015/0326526 A1* | 11/2015 | Zeng | H04L 61/103 | 370/392 |
| 2015/0334057 A1* | 11/2015 | Gao | H04L 49/351 | 370/392 |

* cited by examiner

| DESTINATION MAC ADDRESS 1 | DESTINATION MAC ADDRESS 2 | ... | DESTINATION MAC ADDRESS N | SOURCE MAC ADDRESS | TYPE | PAYLOAD | FCS |

Fig. 6

DELIVERY CONTROL DEVICE, DATA DELIVERY SYSTEM, DELIVERY CONTROL METHOD, AND NON-TRANSITORY COMPUTER READABLE MEDIUM STORING DELIVERY CONTROL PROGRAM

CROSS-REFERENCE TO RELATED APPLICATIONS

This application is based upon and claims the benefit of priority from Japanese patent application No. 2015-032720, filed on Feb. 23, 2015, the disclosure of which is incorporated herein in its entirety by reference.

BACKGROUND

The present invention relates to a delivery control device, a data delivery system, a delivery control method and to, for example, a technique for delivering data simultaneously to a number of reception terminals.

In a limited area such as a large event site e.g., a stadium or a hall, there has been a demand for a technique that delivers data such as video of the site in real time to a number of visitors, for example, tens of thousands of visitors. In order to realize such a data delivery technique, it is important that the number of reception terminals will not exceed the capacity of a router.

Japanese Unexamined Patent Application Publication No. 2014-155072 describes a task that attempts to reduce the number of references to an ARP (Address Resolution Protocol) table so as to increase the speed of network communications. Japanese Unexamined Patent Application Publication No. 2014-155072 further discloses a configuration in which a router includes a connection management table that holds relationships between IP addresses and MAC addresses in addition to the ARP table that holds correspondence relationships between the IP addresses and MAC addresses. This eliminates the need for an access to a main memory that stores the ARP table at the time of transmitting packets and the need for a search process that searches the ARP table for a target entry, thereby reducing the processing load on the router, and thus achieving faster TCP communications.

Japanese Unexamined Patent Application Publication No. 2003-348093 describes a task that attempts to eliminate the need to change an IP address setting of a server application at the time of switching an NIC (Network Interface Card) and the need for the server application to issue a request for switching the NIC. Japanese Unexamined Patent Application Publication No. 2003-348093 further discloses a configuration in which NIC management means 31 assigns registered IP addresses to NICs 41 and 51 that are inside a communication processing device 30, and manages correspondences between the IP addresses and MAC addresses 42 and 52 that have been assigned to the NICs 41 and 51 in an NIC/IP address correspondence table 32. The NIC management means 31 includes a function of detecting a failure of the NIC 41 or 51 and a function of, when the failure in the NIC 41 or 51 is detected, rewriting the NIC/IP address correspondence table 32 to change the assignment of the IP address that has been assigned to one of the NICs 41 and 51 in which the failure has been detected so that the IP address is assigned to another one of the NICs 41 and 51. In this way, it is possible to switch the MAC address while fixing the IP address when a failure occurs, thereby reducing the processing time taken to switch the NICs.

SUMMARY

However, the router disclosed in Japanese Unexamined Patent Application Publication No. 2014-155072 holds one-to-one correspondence relationships between the IP addresses and MAC addresses in the connection management table. The present inventor has found out a problem that the number of simultaneous connections of clients to a router is limited to a maximum number of the IP addresses. More specifically, among the ends of IP addresses 0.0 to 0.255 that are managed by the router, 0.0 is a network address, 0.1 is an address of the router itself, and 0.255 is a broadcast address. Thus, the number of IP addresses that can be assigned to reception terminals is 253, which IP addresses are from 0.2 to 0.254. In this case, the maximum number of reception terminals that can be simultaneously connected to the router is 253.

Further, as the configuration disclosed in Japanese Unexamined Patent Application Publication No. 2003-348093 does not support the switching in a time-sharing manner, it is not suitable for the purpose of increasing the number of simultaneous connections.

There is a well-known technique called IP masquerading (NAPT) that enables a plurality of devices to be connected to a network using one global IP address. However, there has also been a problem in this technique that the number of reception terminals that can be connected is limited by the number of ports on a router.

The present invention has been made to solve such problems and aims to provide a delivery control device, a data delivery system, and a delivery control method that enable simultaneous data delivery to a number of reception terminals by increasing the number of reception terminals simultaneously connecting to a router.

Other problems of the related art and new features of the present invention will become apparent from the following descriptions of the specification and attached drawings.

An aspect of the present invention is a delivery control device that includes: an IP address-MAC address record unit that associates an IP address with a plurality of MAC addresses and holds the IP address and the MAC addresses; and a transmission unit that specifies a destination MAC address to transmit a packet. The transmission unit transmits a packet addressed to the IP address to all the MAC addresses that have been associated with the IP address in the IP address-MAC address record unit.

Another aspect of the present invention is a data delivery system that includes: a delivery control device; and a plurality of clients. The delivery control device includes: an ARP request issue unit that issues an ARP request to the plurality of clients to which the same IP address is assigned; an ARP response receiving unit that creates an IP address-MAC address record unit based on ARP responses received from the clients, in which the IP address-MAC address record unit associates the IP address with a plurality of MAC addresses and holding the IP address and the MAC addresses; and a transmission unit that transmits a packet addressed to a predetermined IP address to all the MAC addresses that have been associated with the IP address in the IP address-MAC address record unit.

Another aspect of the present invention is a delivery control method that includes: an IP address-MAC address record step for associating an IP address with a plurality of MAC addresses and holding the IP address and the MAC addresses; and a transmission step for specifying a destination MAC address to transmit a packet. In the transmission step, a packet addressed to the IP address is transmitted to all the MAC addresses that have been associated with the IP address in the IP address-MAC address record step.

Another aspect of the present invention is a program that causes a computer to execute the above-mentioned delivery control method.

According to the present invention, it is possible to provide a delivery control device, a data delivery system, and a delivery control method that enable simultaneous data delivery to a number of reception terminals by increasing the number of reception terminals simultaneously connecting to a router.

BRIEF DESCRIPTION OF THE DRAWINGS

The above and other aspects, advantages and features will be more apparent from the following description of certain embodiments taken in conjunction with the accompanying drawings, in which:

FIG. 6 is a drawing showing a structure of a transmission frame according to the second embodiment.

DETAILED DESCRIPTION

Firstly, an overview of specific embodiments to which the present invention is applied will be described as follows.

In these embodiments, the same IP address is deliberately assigned to a plurality of reception devices connected to a router. These reception devices each include individual MAC addresses. Moreover, a plurality of MAC addresses are assigned to the same IP address inside the router.

As a method of assigning the plurality of MAC addresses, a first embodiment suggests a method of performing ARP in advance to create a database (an IP address-MAC address record unit) indicating a one-to-many relationship between the IP address and MAC addresses, and referring to this database to transmit a packet while rewriting an ARP table (a table that defines a correspondence relationship between the IP address and MAC addresses) in a time-sharing manner. A second embodiment suggests a method of creating a database that describes a one-to-many relationship between the IP address and MAC addresses, and transmitting the packet while directly referring to this database.

As described above, the "N" MAC addresses are associated with the same IP address, and the packet is transmitted to a plurality of reception terminals to which the same IP address is assigned. This increases the number of simultaneous connections of clients, which is usually limited to the maximum of "M" (=253), to "MN". Therefore, it is possible to provide a video delivery service and the like at the same time to tens of thousands of visitors to a large event site such as a stadium, hall or the like.

Hereinafter, the specific embodiments to which the present invention is applied will be described in more detail with reference to the drawings.

First Embodiment

Figure 1:
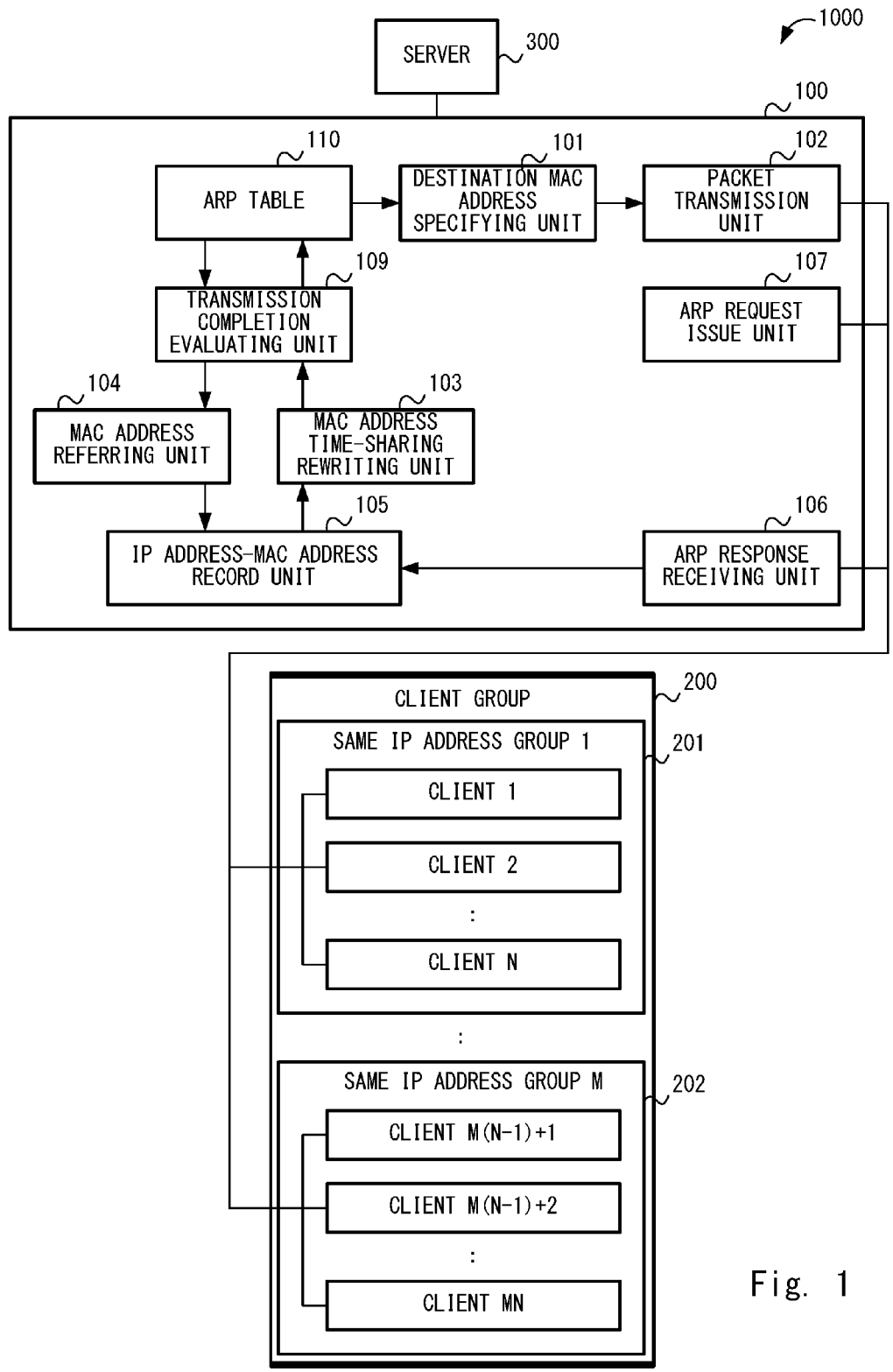
FIG. 1 is a drawing showing a configuration of a data delivery system 1000 according to a first embodiment.

FIG. 1 shows a configuration of a data delivery system 1000 according to the first embodiment. The data delivery system 1000 includes a router 100 serving as a delivery control device, client groups 200 (201 and 202) each including a plurality of reception terminals (clients), and a server 300.

The router 100 includes a destination MAC address specifying unit 101, a packet transmission unit 102, a MAC address time-sharing rewriting unit 103, a MAC address referring unit 104, an IP address-MAC address record unit 105, an ARP response receiving unit 106, an ARP request issue unit 107, a transmission completion evaluating unit 109, and an ARP table 110.

The ARP table 110, the destination MAC address specifying unit 101, the packet transmission unit 102, the ARP request issue unit 107, and the ARP response receiving unit 106 are functions common to those of a known router.

The ARP table 110 is a storage area that holds the correspondence relationship between one IP address and one MAC address.

The destination MAC address specifying unit 101 converts the IP address that has been specified as a destination in a transmission packet into the MAC address by referring to the ARP table 110.

The packet transmission unit 102 transmits the packet to the destination indicated by the MAC address that has been converted by the destination MAC address specifying unit 101.

The ARP request issue unit 107 transmits an ARP request to the clients connected to the router 100. More specifically, the ARP request issue unit 107 requests clients, to which the specified IP address is assigned, to reply MAC addresses of these clients.

The ARP response receiving unit 106 receives, from the clients to which the particular IP address is assigned among the clients connected to the router 100, the MAC addresses as responses to the ARP request.

The router 100 according to the first embodiment is characterized by the configuration including the IP address-MAC address record unit 105, the MAC address referring unit 104, the MAC address time-sharing rewriting unit 103, and the transmission completion evaluating unit 109.

The IP address-MAC address record unit 105 is a storage area that holds a correspondence relationship between the MAC addresses received by the ARP response receiving unit 106 and the IP address specified by the ARP request issue unit 107. In this embodiment, the IP address-MAC address record unit 105 stores the correspondence relationship between one IP address and a plurality of MAC addresses.

The transmission completion evaluating unit 109 analyzes the transmission packet and instructs the MAC address referring unit 104 to sequentially obtain the plurality of MAC addresses corresponding to the IP address (hereinafter referred to as "A") that has been specified as the destination. Further, the transmission completion evaluating unit 109 evaluates whether or not the MAC address time-sharing rewriting unit 103 has processed all the MAC addresses corresponding to "A". In the meantime, the transmission completion evaluating unit 109 repeatedly supplies the transmission packets addressed to the IP address "A" to the destination MAC address specifying unit 101.

The MAC address referring unit 104 refers to the IP address-MAC address record unit 105 to sequentially read the plurality of MAC addresses that are associated with the predetermined IP address "A".

The MAC address time-sharing rewriting unit 103 sequentially rewrites, in the ARP table 110, the MAC address that is associated with the IP address "A" with the MAC addresses read by the MAC address referring unit 104.

The client groups 200 include the "M" groups of clients (201 and 202) each including "N" clients to which the same IP address is assigned. For example, the same IP address group M 202 includes "N" clients (from a client M(N−1)+1 to a client MN). These "N" clients are assigned the same IP address but include MAC addresses that are different from each other.

The server 300 transmits the transmission packet to the router 100. One of IP addresses of the same IP address groups from 1 201 to M 202 is specified as the destination of the transmission packet.

Figure 2:
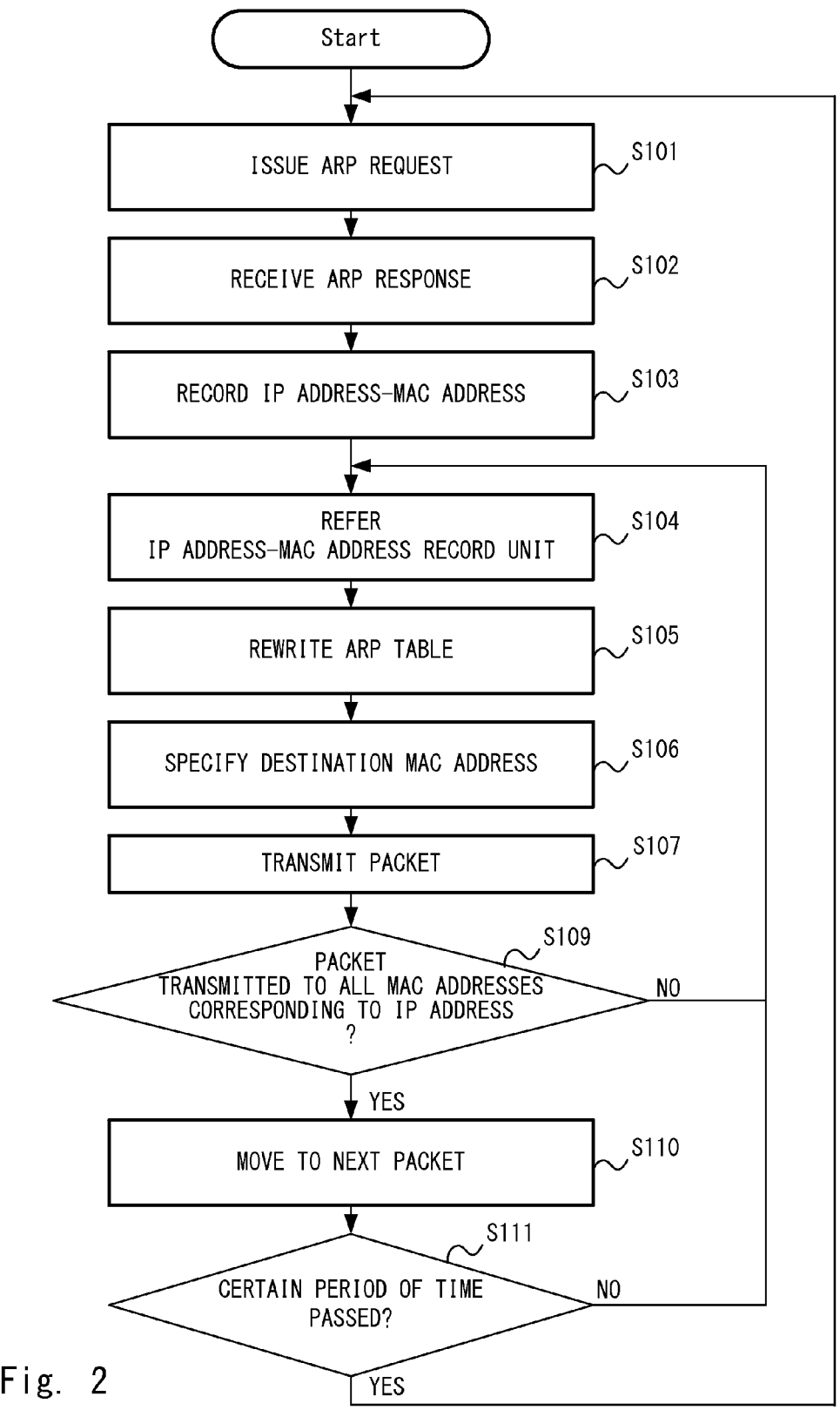
FIG. 2 is a drawing showing an operation of the data delivery system 1000 according to the first embodiment.

Next, an operation of the data delivery system 1000 according to the first embodiment will be described with reference to the flowchart of FIG. 2.

S101:
The ARP request issue unit 107 issues an ARP request to the client groups 200. That is, the ARP request issue unit 107 specifies a particular IP address and requests clients to which this IP address is assigned to reply MAC addresses of these clients.

The clients, to which the specified IP address is assigned in the client groups 200, transmit their MAC addresses to the ARP response receiving unit 106.

S102:
The ARP response receiving unit 106 receives ARP responses from the clients included in the client groups 200. To be more specific, the ARP response receiving unit 106 receives the MAC addresses of the clients to which the specified IP address is assigned from the corresponding clients.

S103:
The ARP response receiving unit 106 associates the received MAC addresses with the IP address that has been specified in S101, and records the MAC addresses and the IP address in the IP address-MAC address record unit 105. In this embodiment, as the same IP address is deliberately assigned to the plurality of clients, the IP address-MAC address record unit 105 holds the IP address and the MAC addresses in a one-to-many relationship.

S104:
The MAC address referring unit 104 refers to the IP address-MAC address record unit 105 to sequentially read the plurality of MAC addresses corresponding to the IP address that has been specified as a destination in a header of the transmission packet received from the server 300. For example, the address referring unit 104 repeatedly reads out the MAC addresses at time intervals "T".

S105:
The MAC address time-sharing rewriting unit 103 sequentially rewrites, in the ARP table 110, the MAC addresses associated with the IP address with the MAC addresses sequentially read out by the MAC address referring unit 104. For example, the MAC address time-sharing rewriting unit 103 repeatedly rewrites the MAC addresses at the time intervals "T". In other words, the ARP table 110 is rewritten in a time-sharing manner.

At the same time, the transmission completion evaluating unit 109 repeatedly supplies the transmission packets to the destination MAC address specifying unit 101. For example, the transmission completion evaluating unit 109 repeatedly supplies the transmission packets at the time intervals "T".

S106:
In response to the transmission packet received from the transmission completion evaluating unit 109, the destination MAC address specifying unit 101 refers to the ARP table 110 to obtain the MAC address that is associated with the destination IP address in the transmission packet. The same transmission packet is repeatedly supplied at, for example, the time intervals "T", and the destination MAC address specifying unit 101 repeatedly obtains the MAC addresses from the ARP table 110 at the time intervals "T". At this time, as the ARP table 110 has been rewritten by the MAC address time-sharing rewriting unit 103 in the time-sharing manner, the MAC addresses obtained by the ARP table 110 will be different each time.

S107:
The packet transmission unit 102 transmits the transmission packet addressed to the MAC address obtained by the destination MAC address specifying unit 101 to the network. Consequently, the client having the MAC address that has been obtained in S106 receives the transmission packet.

S109:
The transmission completion evaluating unit 109 evaluates whether or not the transmission packet has been transmitted to all the MAC addresses that are associated with the IP address in the IP address-MAC address record unit 105.

When the transmission packet has not been transmitted to all the MAC addresses, the processes from S104 to S109 are executed on the MAC address(es) to which the transmission packet has not been transmitted. On the other hand, when the transmission packet has been transmitted to all the MAC addresses associated with the IP address, the process proceeds to S110.

S110:
The transmission completion evaluating unit 109 completes the transmission process of the transmission packet that is being processed, and executes the processes from S101 to S109 on another transmission packet that has been received from the server 300.

S111:
Generally, the ARP table 110 will be discarded after a certain period of time from creation thereof. Thus, in a manner similar to that in the above general case, it is preferable to reissue an ARP request after a certain period of time and recreate the IP address-MAC address record unit 105 in this embodiment. It is common to set the certain period of time to about one hour, although it depends on the OS (Operating System) and setting.

Figure 3:
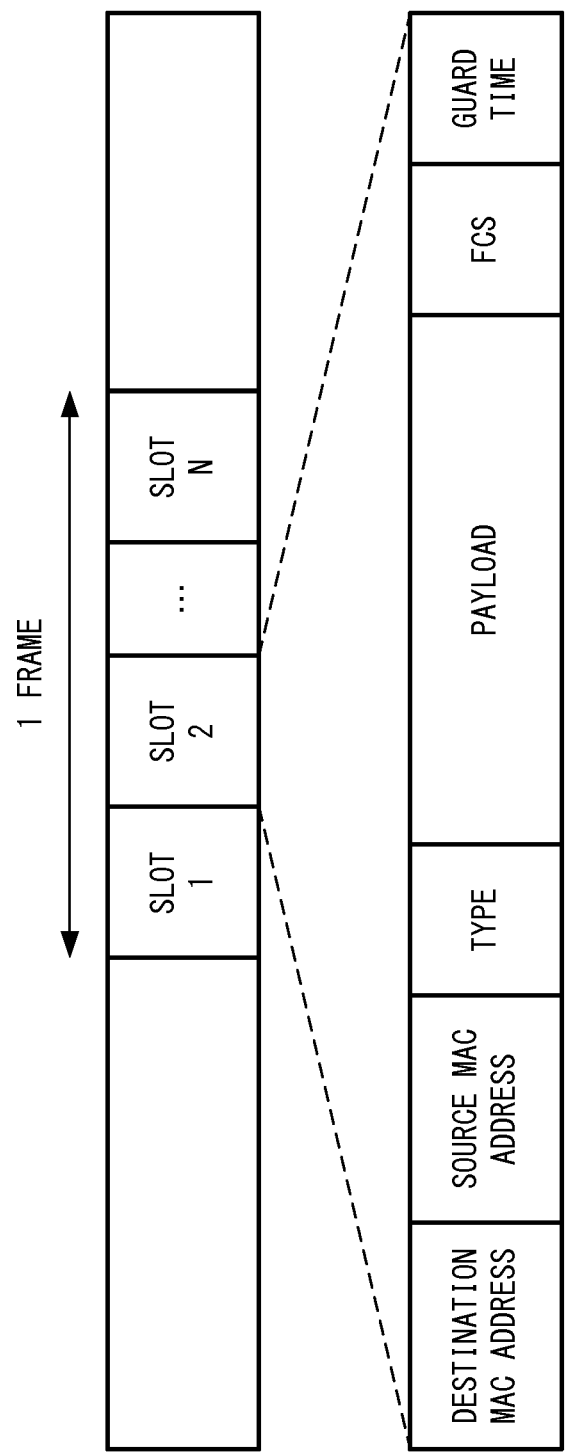
FIG. 3 is a drawing showing a structure of a transmission frame according to the first embodiment.

FIG. 3 shows a structure of a transmission frame according to the first embodiment. The transmission frame is comprised of a plurality of time slots 1 to N. Each slot indicates the same meaning as that of the transmission packet in the above explanation.

The structure inside the slot includes a destination MAC address, a source MAC address, a type that sets an ID indicating an upper layer protocol which is stored in a subsequent payload, the payload (data), and FCS (Frame Check Sequence) in a normal layer 2 PDU (Protocol Data Unit), as well as a guard time at the end. The guard time is set for the purpose of preventing transmission data from interfering with data of the previous and next slots.

In the case of, for example, IPv4, the destination MAC address is 48 bits, the source MAC address is 48 bits, the type is 16 bits, the payload is 368 to 12000 bits, and the FCS is 32 bits. However, the present invention does not limit the number of bits and can be applied regardless of the number of bits.

In one frame, the source MAC address is the same for all the slots, and only the destination MAC addresses are different from each other. More specifically, the destination MAC addresses are switched from the slot 1 to the slot N to the MAC addresses of "N" devices to which the same IP address is assigned. Thus, the packet can be simultaneously transmitted to the plurality of clients to which the same IP address is assigned.

In the first embodiment, the same IP address is assigned to the plurality of clients that are connected to the router 100, and the router 100 creates the IP address-MAC address record unit 105, switches the plurality of MAC addresses corresponding to the same IP address in the time-sharing manner, and sequentially transmits the packets. In this manner, it is possible to connect, to the router, clients exceeding the maximum number of IP addresses and the limited number of ports, thereby achieving simultaneous data delivery to a number of clients.

Further, in the first embodiment, the structure of the slot is similar to that of the packet used in the existing TCP/IP network except for the guard time. Thus, there is an advantage that the first embodiment can be easily adapted to the existing infrastructure.

Second Embodiment

Figure 4:
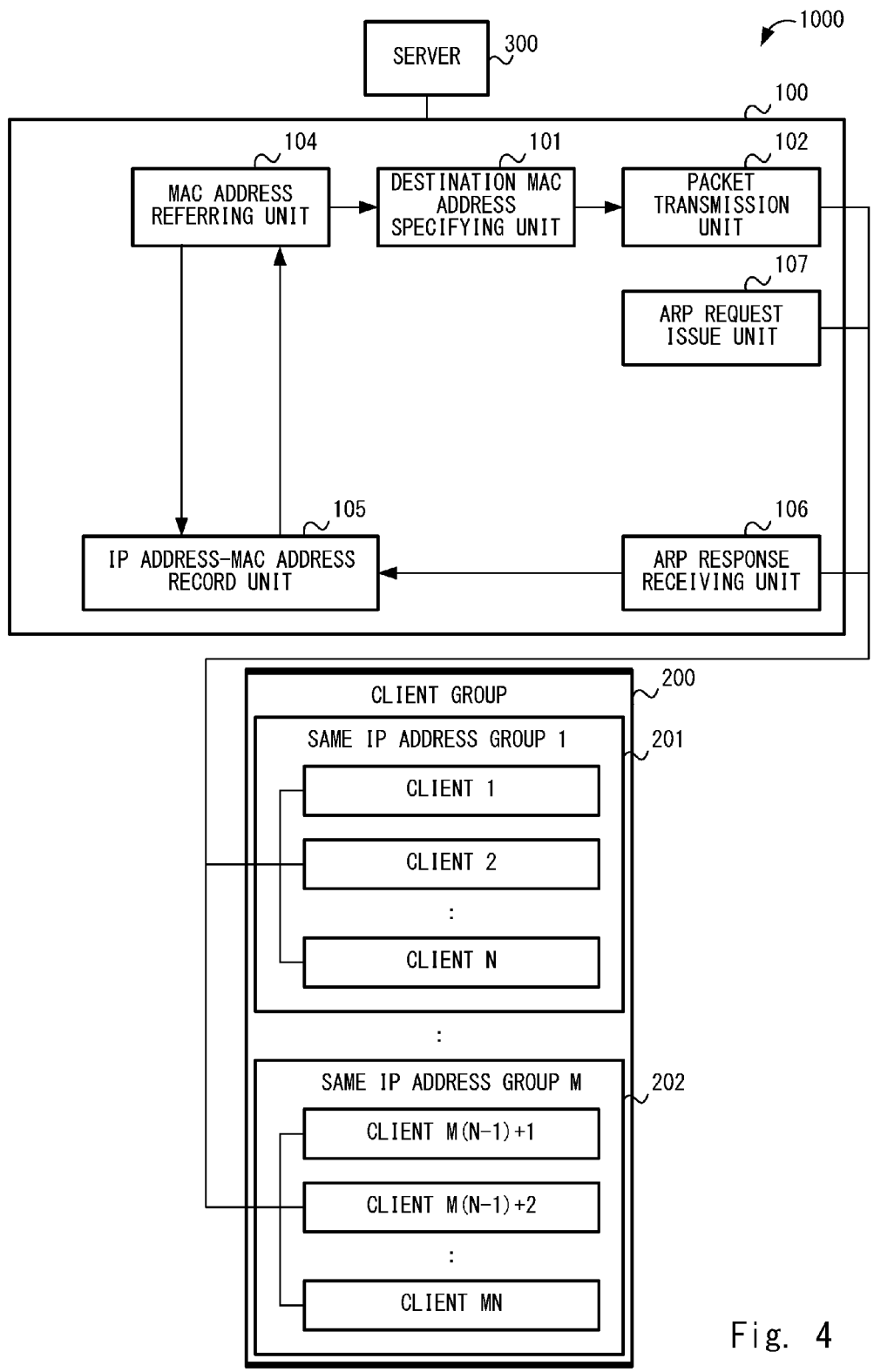
FIG. 4 is a drawing showing a configuration of a data delivery system 1000 according to a second embodiment.

FIG. 4 shows a configuration of a data delivery system 1000 according to a second embodiment. The second embodiment in not provided with the ARP table 110, the transmission completion evaluating unit 109, and the MAC address time-sharing rewriting unit 103 provided in the first embodiment. To be more specific, this embodiment is characterized by the configuration in which the destination MAC address specifying unit 101 directly refers to the IP address-MAC address record unit 105 via the MAC address referring unit 104 instead of using the ARP table 110.

Figure 5:
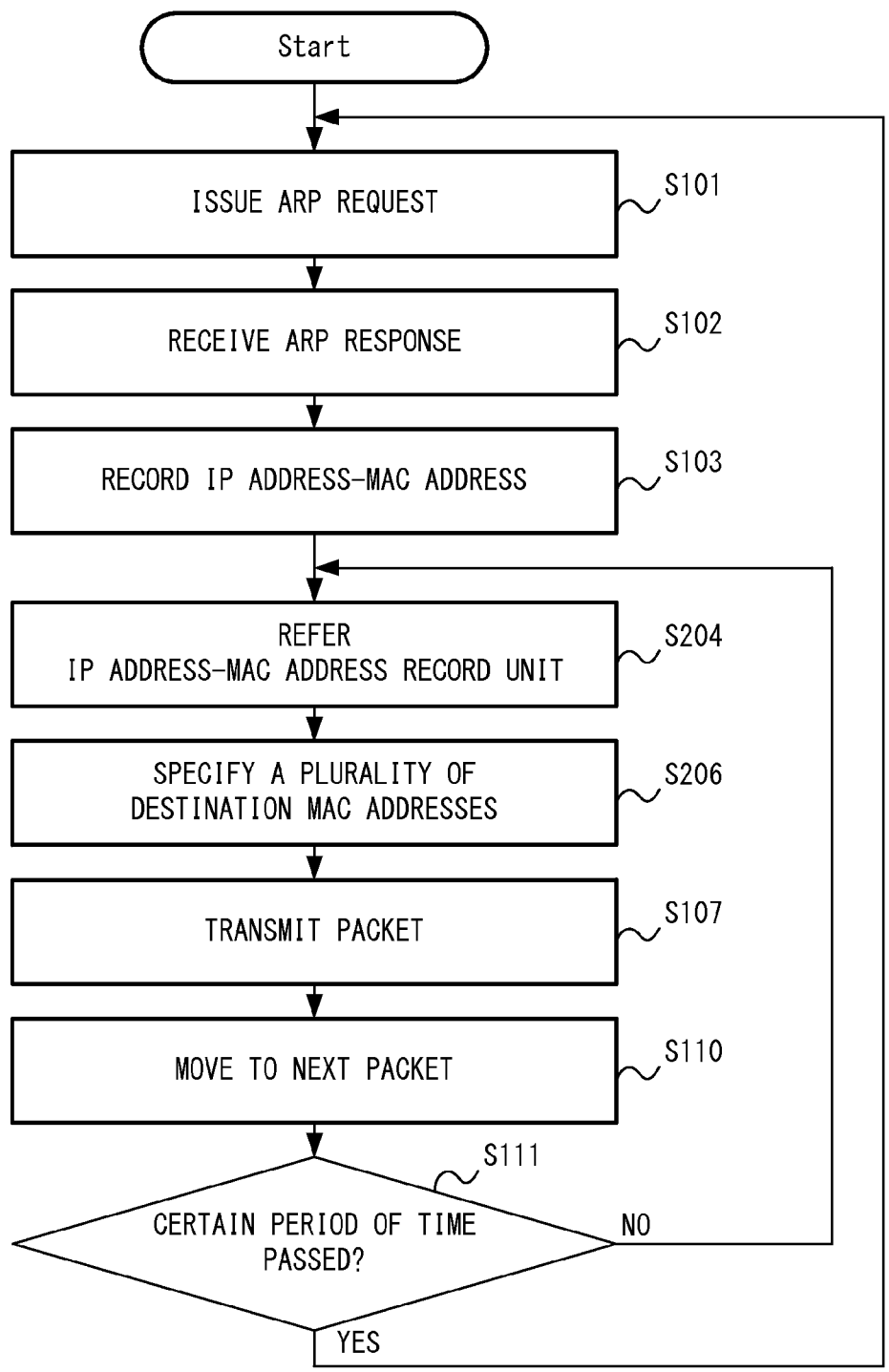
FIG. 5 is a drawing showing an operation of the data delivery system 1000 according to the second embodiment.

Next, an operation of the data delivery system 1000 according to the second embodiment will be described with reference to the flowchart of FIG. 5.

S101 to S103

In a manner similar to that of the first embodiment, the ARP request issue unit 107 and the ARP response receiving unit 106 create the IP address-MAC address record unit 105.

S204

The MAC address referring unit 104 refers to the IP address-MAC address record unit 105 to sequentially read the plurality of MAC addresses corresponding to the IP address that has been specified as a destination in a header of the transmission packet received from the server 300. The MAC addresses are repeatedly read out at, for example, the time intervals "T".

S206:

The destination MAC address specifying unit 101 obtains a plurality of MAC addresses that have been associated with the destination IP address in the transmission packet from the MAC address referring unit 104. The destination MAC address specifying unit 101 generates a transmission frame (see FIG. 6) addressed to these plurality of MAC addresses.

S107:

In a manner similar to that of the first embodiment, the packet transmission unit 102 transmits the transmission frame addressed to the plurality of MAC addresses that have been specified by the destination MAC address specifying unit 101 to the network. Consequently, the clients having the MAC addresses that have been specified in S206 receive the transmission packet.

Note that in this embodiment, the structure of the transmission packet is slightly different from that of the packet used in the existing TCP/IP network. That is, this embodiment is characterized in that there are a plurality of destination MAC addresses. It is thus necessary for the client to include application software and the like that can interpret such a frame structure.

S110 to S111

In a manner similar to that of the first embodiment, the destination MAC address specifying unit 101 executes the processes from S101 to S103, S204, S206, and S107 on other transmission packets received from the server 300.

S111:

In a manner similar to that of the first embodiment, the ARP request issue unit 107 and the ARP response receiving unit 106 reissue an ARP request after a certain period of time and recreate the IP address-MAC address record unit 105.

FIG. 6 shows a structure of the transmission frame according to the second embodiment. In the structure of this transmission frame, the number of destination MAC addresses is increased to "N" whereas only one destination MAC address is specified in a normal transmission packet. The "N" MAC addresses are the MAC addresses of the plurality of clients to which the same IP address is assigned. This makes it possible for all the devices specified by the destination MAC addresses to receive this transmission frame. Note that other components inside the frame and the number of bits of these components are the same as those explained in regard to the first embodiment.

In the second embodiment, the destination MAC address specifying unit 101 refers to the IP address-MAC address record unit 105 to obtain the plurality of MAC addresses corresponding to the destination IP address. Further, the destination MAC address specifying unit 101 creates the transmission frame addressed to these MAC addresses. This eliminates the need for the process that rewrites the ARP table 110 in the time-sharing manner, the process of checking as to whether or not the transmission to all the MAC addresses has been completed and the like which, as has been explained, are performed in the first embodiment. Therefore, the processing load on the router 100 can be reduced.

Third Embodiment

Figure 7:
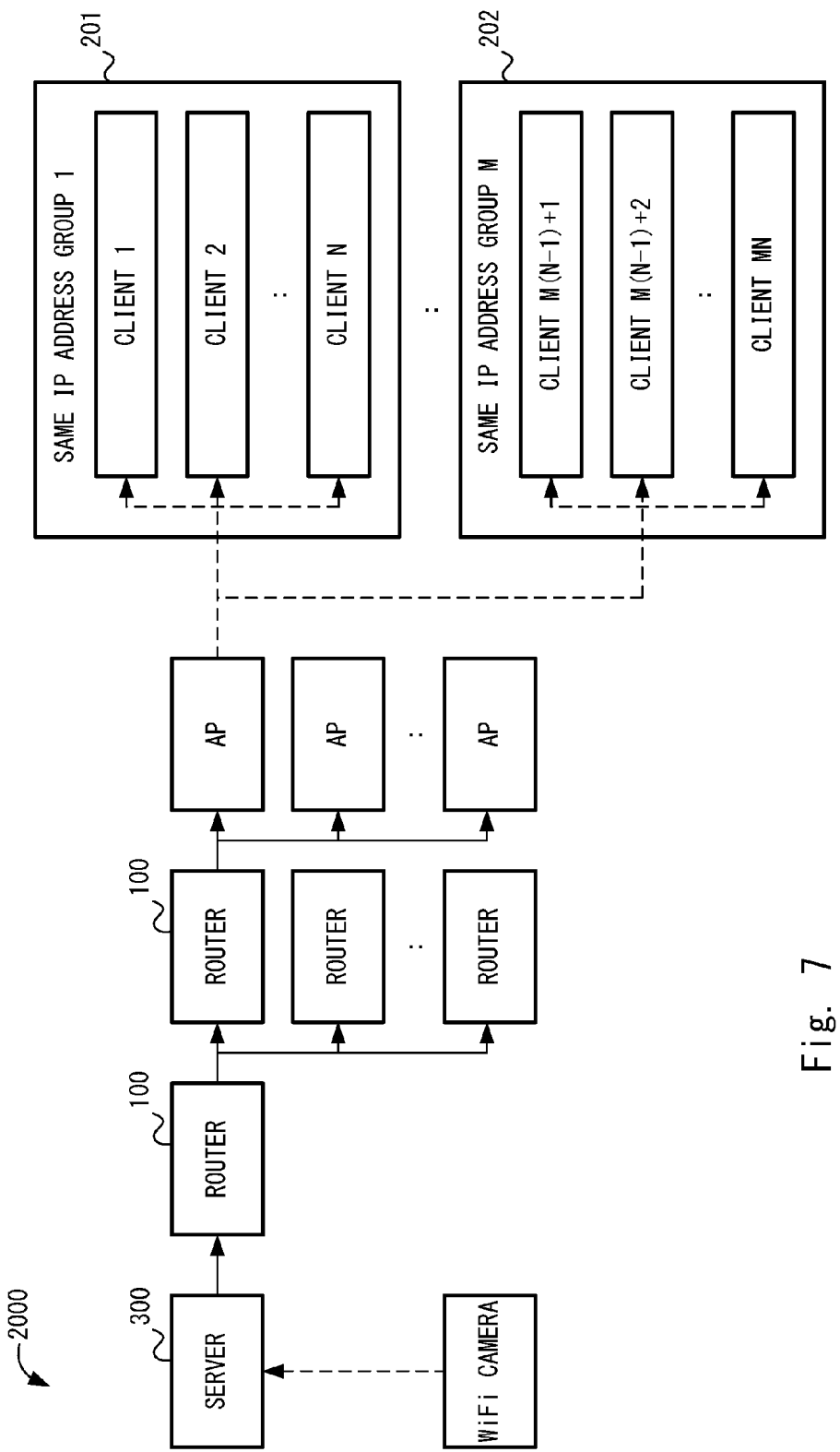
FIG. 7 is a drawing showing an example of application of the data delivery system 1000.

FIG. 7 is a configuration example of a video delivery system 2000 at a large event site using the router 100 according to the first or second embodiment.

The video delivery system 2000 is comprised of a WiFi camera that captures moving images and uploads video data to a server, a server, routers 100, access points (AP), and "M" client groups each including "N" clients to which the same IP address is assigned. Although the communication path between these elements can be either wired or wireless, in this embodiment, a wireless communication shall be assumed, as the video is delivered to the visitors to the event site via WiFi, and the APs are located at end terminals of the wired network so as to achieve the wireless communication.

In related art, generally the number of routers and APs that are provided is increased in order to simultaneously provide a network connection to a number of users. However, as mentioned above, even when the number of routers that are provided is increased, the number of connections is limited due to the limitation in the number of IP addresses.

As to the AP, when the APs of the same channel are placed in proximity to each other, there is a problem of channel interference. As the number of channels that can be used simultaneously in the WiFi is limited (e.g. four channels for IEEE 802.11b, and 19 channels for IEEE 802.11a), it is difficult to dispose a number of APs in a small area such as an event site without channel interference.

In contrast, according to the configuration of the third embodiment, the router 100 according to the first or second embodiment is employed instead of a known router. Thus, it is possible to connect more clients than the maximum number of IP addresses in the known router. At the same time, as the configuration according to the third embodiment requires a smaller number of APs than that of the known router for ensuring the same number of connections, it is possible to alleviate the problem about channel interference in WiFi.

Other Embodiment

Although the embodiments carried out by the present inventor have been described in detail, it is obvious that the present invention is not limited to the above-described embodiments, and various modifications can be made without departing from the scope of the invention.

To clarify the explanation, some parts thereof and some of the drawings have been omitted or simplified as appropriate. Further, the elements illustrated in the drawings as functional blocks for performing various processes can be implemented hardware-wise by a CPU, a memory, and other circuits, and software-wise by a program loaded onto a memory or the like. Accordingly, it is to be understood by those skilled in the art that these functional blocks can be implemented in various forms including, but not limited to, being implemented by hardware alone, software alone, or a combination of hardware and software. Note that in the drawings, the same elements are denoted by the same reference numerals, and repeated descriptions are omitted as needed.

Further, the above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A non-transitory computer-readable storage medium storing instructions that cause a computer system executing the instructions to:
   receive, from a server, a packet including a first Internet Protocol (IP) address as a destination of the packet;
   transmit an Address Resolution Protocol (ARP) request to a first client and a second client both to which the first IP address is assigned;
   receive, in response to the ARP request, a first ARP response including a first Media Access Control (MAC) address from the first client and a second ARP response including a second MAC address from the second client;
   store, in an IP address-MAC address record, a correspondence relationship of the first MAC address and the second MAC address with the first IP address;
   read the first MAC address from the IP address-MAC address record;
   write the read first MAC address into an ARP table, wherein the read first MAC address is mapped to the first IP address in the ARP table;
   transmit the packet to the first MAC address by referring to the first MAC address mapped to the first IP address in the ARP table;
   read sequentially the second MAC address from the IP address-MAC address record after a predetermined period of time elapsed since the first MAC address is read from the IP address-MAC address record;
   update and rewrite the ARP table by mapping the read second MAC address to the first IP address in place of the read first Mac address in the ARP table; and
   transmit the packet to the second MAC address by referring to the second MAC address mapped to the first IP address in the APR table.

2. The non-transitory computer-readable storage medium of claim 1, wherein the ARP table is configured to store an one-to-one correlation between an IP address and an MAC address, and
   the first MAC address and the second MAC address are written and rewritten into the ARP table in a time-sharing manner.

3. A delivery control system comprising:
   a processor; and
   a machine-readable medium comprising instructions stored therein, which when executed by the processor, cause the processor to perform operations comprising:
      transmitting an Address Resolution Protocol (ARP) request to a first client and a second client both to which the first IP address is assigned in response to receiving a packet including a first Internet Protocol (IP) address as a destination of the packet from a server;
      receiving, in response to the ARP request, a first ARP response including a first Media Access Control (MAC) address from the first client and a second ARP response including a second MAC address from the second client;
      storing, in an IP address-MAC address record, a correspondence relationship of the first MAC address and the second MAC address with the first IP address;
      reading the first MAC address from the IP address-MAC address record;
      writing, to an ARP table, the read first MAC address, wherein the read first MAC address is mapped to the first IP address in the ARP table;

transmitting the packet to the first MAC address by referring to the first MAC address mapped to the first IP address in the ARP table;

reading sequentially the second MAC address from the IP address-MAC address record after a predetermined period of time elapsed since the first MAC address is read from the IP address-MAC address record;

updating and rewriting the ARP table by mapping the read second MAC address to the first IP address in place of the read first Mac address in the ARP table; and transmitting the packet to the second MAC address by referring to the second MAC address mapped to the first IP address in the APR table.

4. The delivery control device according to claim 3, wherein the ARP table is configured to store an one-to-one correlation between an IP address and an MAC address, and the writing of the first MAC address and the rewriting of the second MAC address into the ARP table is performed in a time-sharing manner.

* * * * *